United States Patent [19]

Degasperi

[11] 4,075,604

[45] Feb. 21, 1978

[54] METHOD AND APPARATUS FOR REAL TIME IMAGE RECOGNITION

[75] Inventor: Mario Marco Degasperi, Milan, Italy

[73] Assignee: Tasco S.p.A., Milan, Italy

[21] Appl. No.: 762,423

[22] Filed: Jan. 25, 1977

[30] Foreign Application Priority Data

Feb. 23, 1976 Italy .................................. 20452/76

[51] Int. Cl.² ............................................. G06K 9/00
[52] U.S. Cl. .......................... 340/146.3 AG; 250/226; 340/146.3 B; 356/71
[58] Field of Search .................. 340/146.3 R, 146.3 B, 340/146.3 CA, 146.3 AG, 146.3 D; 235/151.3; 250/226; 356/77, 96, 98, 173, 178, 179, 195, 71

[56] References Cited

U.S. PATENT DOCUMENTS

| | | | |
|---|---|---|---|
| 3,705,383 | 12/1972 | Frayer | 340/146.3 R |
| 3,805,239 | 4/1974 | Watanabe | 340/146.3 MA |
| 3,829,218 | 8/1974 | Alyanak | 356/98 |
| 3,858,044 | 12/1974 | Frappe | 250/226 |
| 3,930,230 | 12/1975 | Stephens | 340/146.3 D |
| 3,935,562 | 1/1976 | Stephens | 340/146.3 D |
| 3,999,047 | 12/1976 | Green | 235/151.3 |

Primary Examiner—Leo H. Boudreau
Attorney, Agent, or Firm—Fidelman, Wolffe & Waldron

[57] ABSTRACT

Method and apparatus for real time recognition of test images by comparison with sample images. The test image to be recognized is scanned to produce a plurality of analog signals of the luminance levels. These luminance signals are screened to eliminate background signals and are converted to digital signals. A distribution function of the occurrence frequency versus the luminance level is determined from the test image signals. Typical parameters of said distribution function are calculated and compared with sets of stored corresponding parameters derived in a similar manner from known reference sample images. A recognition signal is outputted to indicate the sample image which most closely resembles the test image as determined by said comparison, provided that the quantitatively determined differences between test and sample images are below a predetermined threshold value.

17 Claims, 9 Drawing Figures

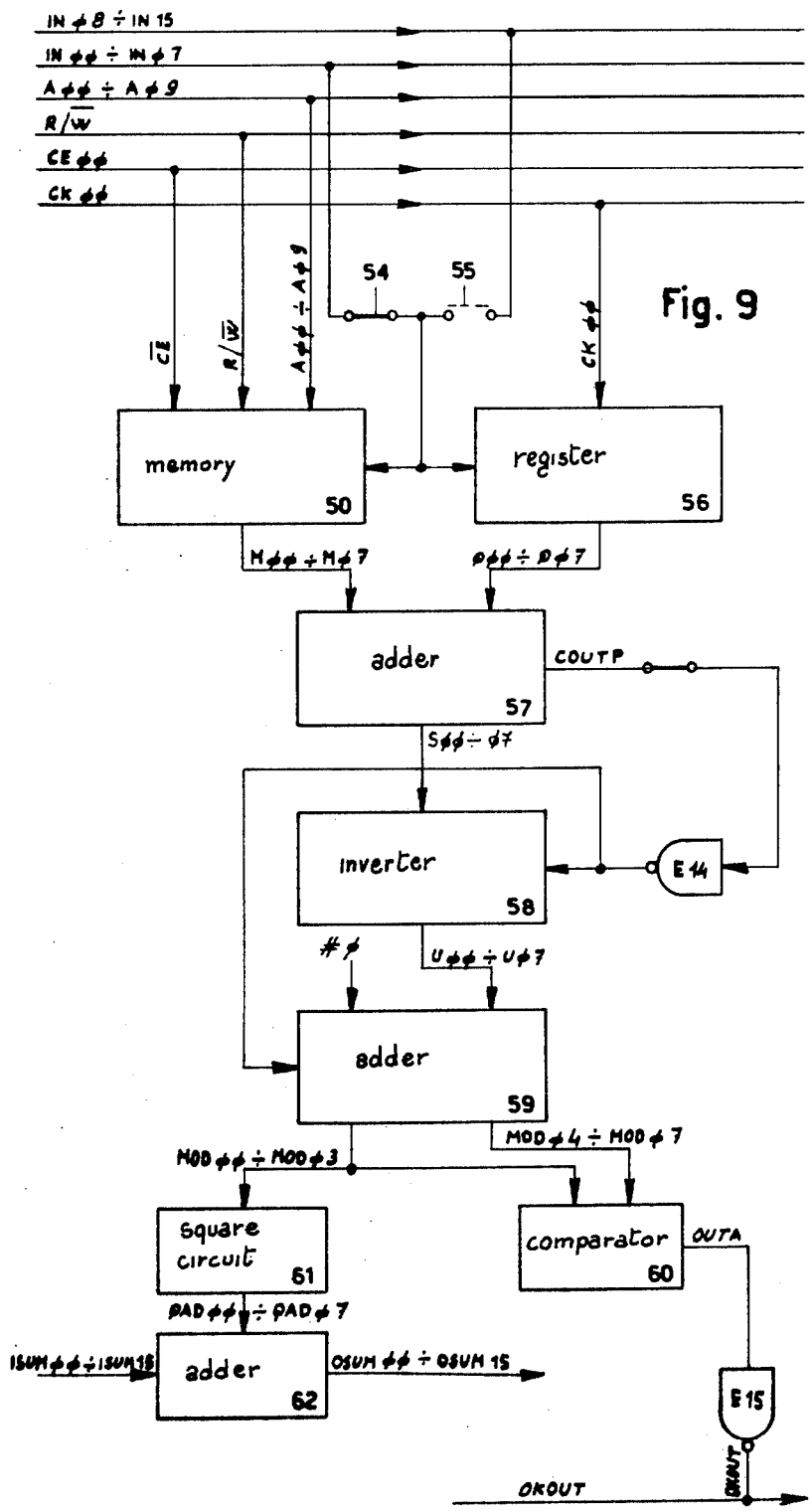

METHOD AND APPARATUS FOR REAL TIME IMAGE RECOGNITION

This invention relates to properly designed method and apparatus for real time recognition of general images, that is to say images of both bidimensional and tridimensional objects.

In addition to precoding systems with binary or numerical codes in standard, fluorescent or magnetic writing recognizable by suitable readers, there are in the general field of image recognition and character reading many systems for analyzing an image through the external and/or internal contours of the image.

These systems essentially seek to obtain an actual reading and analysis of each part or specific parts of the image and require a highly accurate positioning of the object to be recognized. Generally, such systems are slow or involve low speeds in moving the objects to be recognized in front of a reading device.

The present invention proposes a method and apparatus for real time image recognition, affording high speed in analyzing and comparing a real image to be recognized with a variety of stored sample images. The present invention also allows a large tolerance in positioning the individual objects or articles to be recognized through the relative analyzed image. The present invention permits operation with mechanical movement systems operating at a very high speed.

Further advantages of the invention reside in the very high number of models with which the test images to be recognized can be compared thereby providing the capability of analyzing any image in a much more detailed manner. It is specified that the term "image" as herein used refers to an image both as a whole and one or more parts thereof.

In order to better illustrate the features of the method and apparatus as herein claimed, reference will now be made to the recognition of discount coupons frequently associated with products on sale. However, it is to be understood that the method and apparatus according to the subject invention could be used for recognizing the image of any general bidimensional and tridimensional objects or articles, such as tile recognition and sorting.

As is well known, there is at present the need of recognizing, selecting and separating and counting all the discount coupons delivered daily to manufacturing firms. The number of discount coupons that retailers receive and present to manufacturers for refund is enormous. Throughout the world at present these coupons are manually handled, first by the retailers and then by the manufacturers primarily because the different sizes of the coupons, the different thicknesses of the paper and additional characteristics of such coupons do not allow an accurate positioning and reasonable speed when using conventional readers.

Therefore, it is the object of the present invention to provide a method and apparatus for enabling general image recognition, and more particularly a completely automatic method and apparatus for recognition, selection and counting of discount coupons.

Generally, according to the method of the invention, it is provided to carry out reading and conversion of the test image to be recognized into analogue signals of luminance levels and separating of said signals, conversion of the separated signals from analogue to digital values in accordance with a scale of luminance levels; determination of a distribution function of the luminance level frequency of occurrence by accumulation and storage of the quantities of values having a same luminance level, calculation of typical parameters of the distribution function of the luminance level frequencies, comparison of the series of typical parameters of the test image to be recognized with those of corresponding stored parameters of a plurality of sequentially taken sample images, determination of minimum comparison value between the series of parameters and generation of a signal for identifying the test image to be recognized with the sample image corresponding to the determined minimum comparison value, when the latter is lower than a predetermined threshold value.

Generally, an apparatus for carrying out the above described method comprises: an image reading and separating device, a signal converter from analogue into digital values; a device for determining the distribution function of the luminance level frequencies by separate accumulation and storage of values having a same luminance level; a device for calculating the typical parameters of said function, the apparatus also comprising a device for storing and comparing the series of typical parameters for the test image to be recognized with a stored series of corresponding parameters of a plurality of reference sample images, and a device for determining the minimum difference between the test and sample parameter series and comparing said difference with a threshold value, generating a signal identifying the test image to be recognized with the sample image corresponding to the determined minimum comparison value which is less than said threshold value.

The invention will be now described in further detail with reference by way of example to the accompanying drawings, in which:

FIG. 9 is a detailed scheme showing one of the storing and comparing blocks of FIG. 7.

Figure 1:
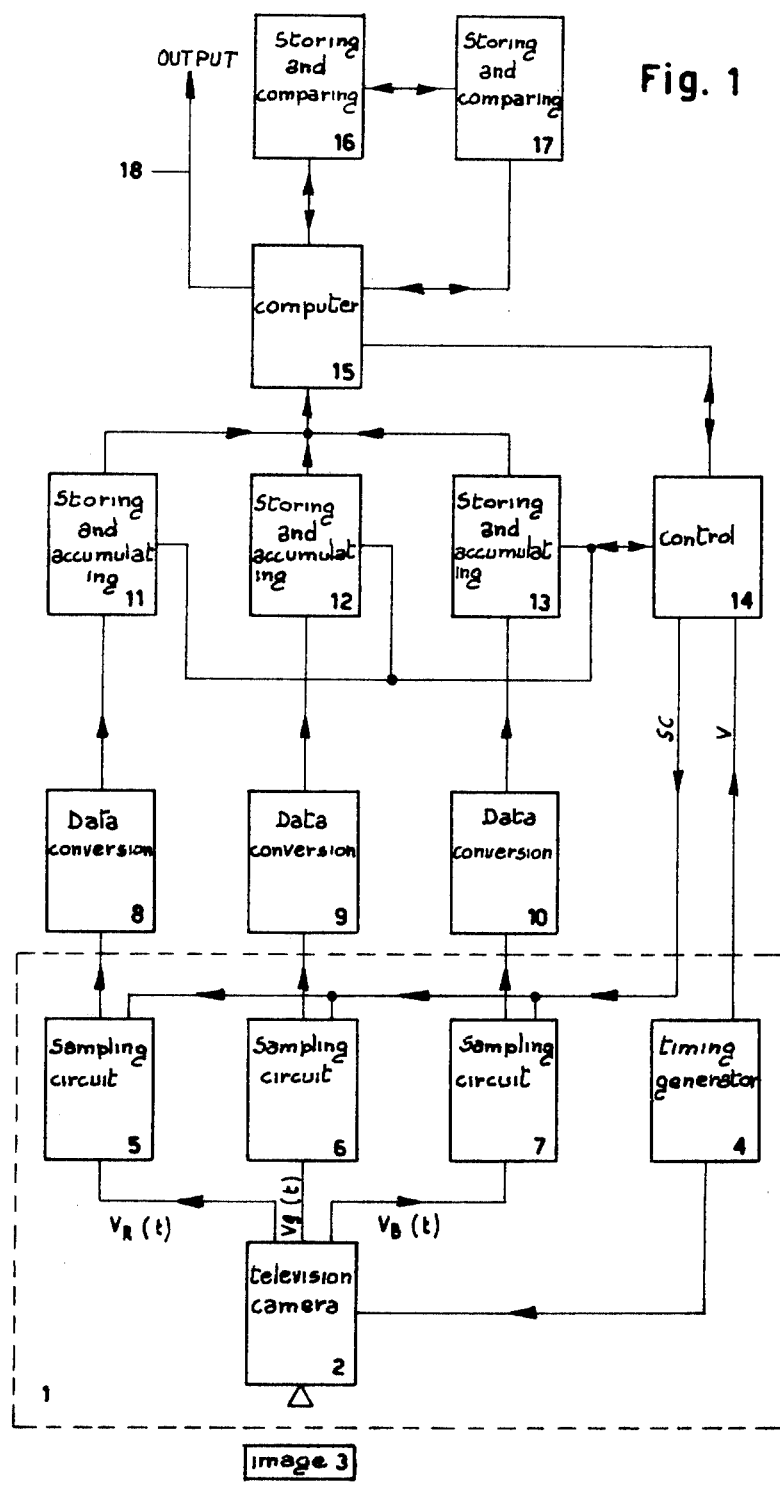
FIG. 1 is a schematic block diagram representation of the apparatus according to the invention.

In FIG. 1 there is shown the general block diagram of the apparatus which will be hereinafter described concurrently with its operating principle according to the method of the invention.

In FIG. 1, the block 1 shown by dashed lines designates a general reading apparatus, optionally capable of decomposing the test image into its basic chromatic components, for example into red, green and blue colours, as well as separating or dividing the test image or each of the chromatic components into spots or dots, for each of which a determined value or rate of an analogue luminance level signal is obtained.

In this exemplary case, such a reading device comprises a colour television camera 2, in front of which the object or test image 3 to be recognized is placed. This colour television camera 2 takes test image 3 under examination and translates the chromatic information relating to red, green and blue colours into corresponding electrical signals. Of course, due to the nature of block 2, the complete description of the test image is periodically repeated at a frequency of 50 Hz and the beginning of each period is suitably signalled by timing generator 4.

Each of the three electrical signals outgoing from television camera 2 are sampled in a sampling circuit 5, 6 and 7, respectively, for providing separation or division of each of the image components into dots, each sampling circuit produces a analogue signal relating to the luminance level of the dot corresponding thereto.

Instead of said television camera 2 and sampling circuits 5, 6 and 7, any reading and separating or dividing apparatus could be used such as, for example, a battery of photodiodes or a flying spot.

The output of each sampling device 5, 6 and 7 is supplied to an analogue-digital conversion circuit, designated by 8, 9 and 10 respectively for the three chromatic components of the test image. The signal sampling and converting circuits are per se well known, for example such as those sold by DDC-Model VADC 8/17, whereby no further description thereof will be given in the following. It should only be noted that to obtain a good image resolution, the sampling frequency should be high, for example in the order of 4 MHz.

Therefore, at the output of blocks 8, 9 and 10 the same periodic information still occurs as at the output of the above described television camera 2, but now in digital and not in analogue form.

Each of the conversion blocks 8, 9 and 10 are connected to a storing and accumulating block for the individual signals which are further separated into discrete classes of a same luminance level, respectively designated at 11, 12 and 13, which in turn are controlled by a control block 14 which is also connected to the above mentioned timing generator 4 and sampling circuits 5, 6 and 7. Each of these storing and accumulating blocks 11, 12 and 13 serve for generating a distribution function $g(li)$ of the frequency of spots versus the discrete luminance level of the corresponding chromatic component of the image. This distribution is as shown for example in FIG. 2, wherein the ordinates show the occurrence frequency or number of spots having the luminance level given on the abscissas. By suitable lower and/or upper threshold circuits, the signals associated with the background having the test image bearing thereon are removed, which background may be of opaque black or white colour to differentiate it from the test image. It should also be noted that for each of the chromatic components of the test image, in addition to said function $g(li)$ of the luminance levels, also the number $\overline{N}$ of the function spots being used is obtained.

The various storing and accumulating blocks are connected in turn to a device for calculating the typical parameters of each distribution function $g(li)$ for the luminance levels, which device could, for example, form part of a suitably programmed computer 15 to perform also the operation of identifying the test image to be recognized with a corresponding sample image selected among a plurality of sample images suitably previously stored in a storing and comparing block 16 which is connected with said computer 15 and to a control block 17 (FIG. 1).

Figure 3:
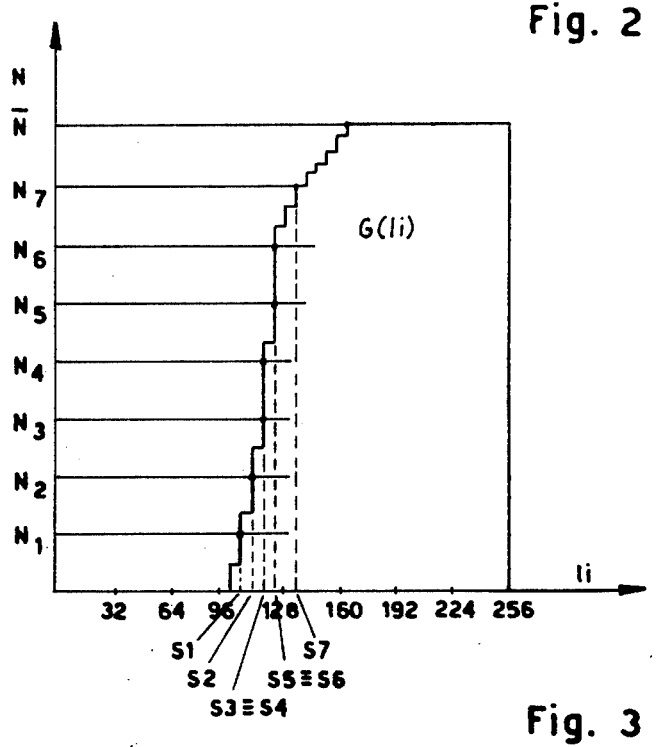
FIG. 3 shows the diagram for the accumulated luminance level frequencies used for calculating the typical parameters of the function of FIG. 2, for enabling a comparison of an image to be recognized with the corresponding sample image.

The calculation of the typical parameters of each function $g(li)$ of the frequency distribution of the luminance levels may be provided, for example, as follows: the single discrete values of function $g(li)$ are sequentially transferred to computer 15 where the typical parameters are calculated. In the exemplary case shown, the following procedure is followed: a sequence of operations are carried out individually for each of the three chromatic components in computer 15 as required for determining, by integration of the functions $g(li)$, the corresponding accumulated occurrence frequency functions $G(li)$, of which one is shown in FIG. 3. Therein the ordinate axis shows the number of spots (signals) of one color having a luminance level equal to or less than the luminance level shown on the abscissa axis. This function $G(li)$ is divided on the ordinate axis into $x$ equal or like parts, for example eight parts, obtaining $x-1$ corresponding parameter values on the abscissa. For example, seven "octiles" are obtained in a division of the ordinate into eight parts.

As a result, taking into account three chromatic components of test image decomposition according to the example shown and using octiles, there will be 21 parameter values, to which is added the number, $\overline{N}$, relating to the total of spots used for a predetermined chromatic component.

It is now necessary to determine whether the test data parameters described above are related to the typical parameters of known sample images, said typical sample parameters having been previously acquired and stored. In other words the test image data and sample image data are to be compared automatically so as to "recognize" the test image if it actually or closely matches a sample image.

In acquisition and storage, the operation being accomplished is that of sequentially transferring the typical parameters of all of the sample images (22 parameters in this specific case, comprising 21 octiles, plus number $\overline{N}$ of used spots of a predetermined chromatic component), storing each of the parameters and corresponding addresses of all of the sample images in a respective storing and comparing unit, as later described.

On the contrary, in the latter case (image recognition), the parameters of the image to be recognized are sequentially supplied to the registers of the various storing and comparing units, in each of which the relating parameter of the image to be recognized is successively compared with all of the corresponding parameters of the sample images.

The results of the comparisons are supplied to computer 15, the latter effecting a selection operation of the results, thus identifying the images to be recognized with the corrsponding sample image. When recognition has occurred, said computer generates at an output 18 thereof a recognition signal that can be used to control an apparatus for handling the objects to be recognized.

Now, a further detailed description will be given for blocks 11, 12, 13, 14, 16 and 17, the interconnections thereof and the connections with the remaining blocks of the apparatus, which should be intended as per se known or in any case commercially available. By mere way of illustration, it is to specify that computer 15 could be a PDP11/05SD Model computer provided from Digital Equipment Corporation.

Figure 4:
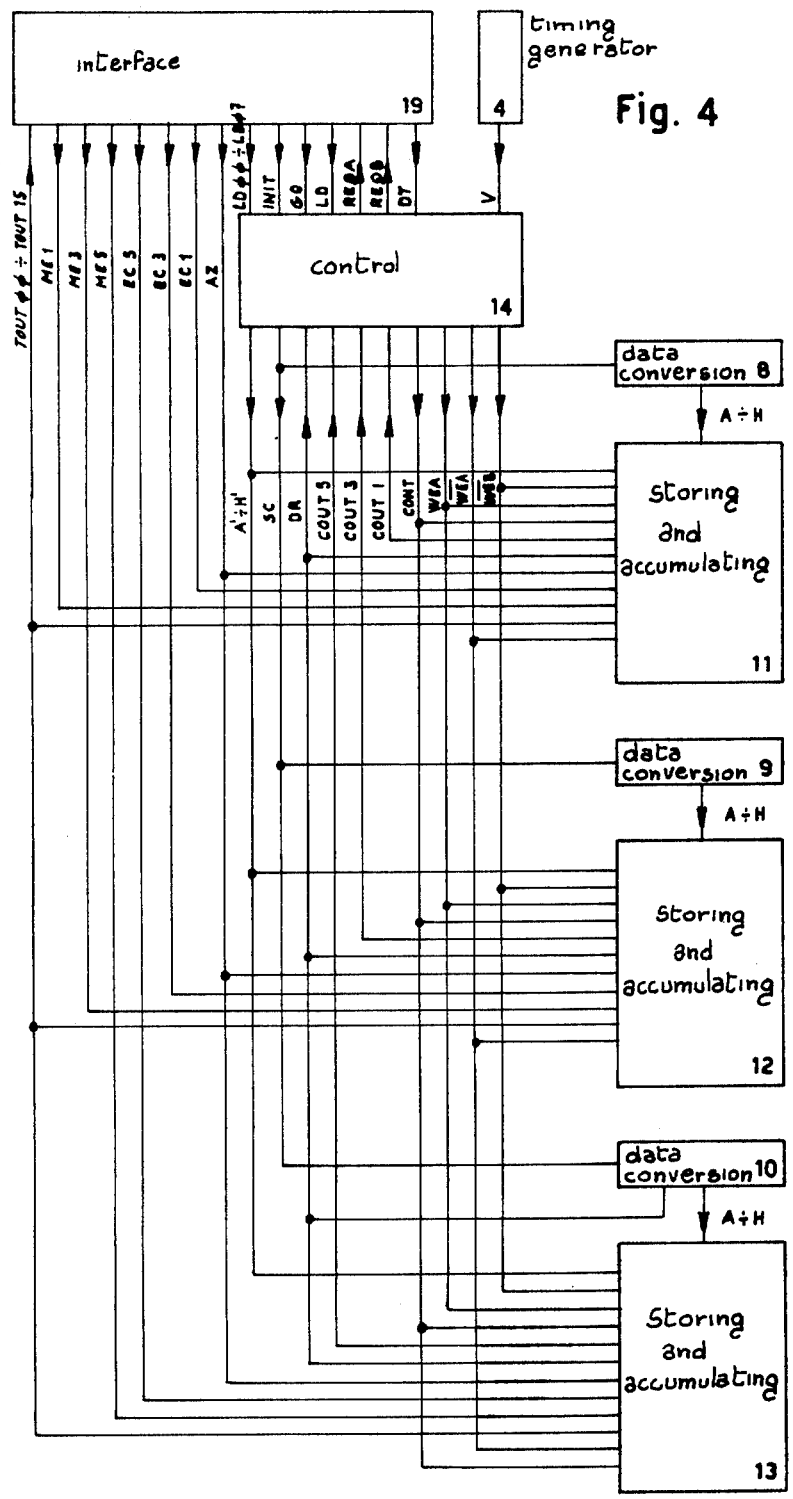
FIG. 4 is a detailed scheme showing the connections between the various storing and accumulating blocks of the luminance levels, and the device for calculating the typical parameters of each of the distribution functions of the luminance level frequencies.

FIG. 4 is a detailed view showing the connections between said three storing and accumulating blocks 11, 12 and 13 and the remaining blocks of the apparatus. More particularly, in FIG. 4 and subsequent figures the identical blocks will be designated by the same reference numerals or letters.

Finally, it is precisely stated that hereinafter we will describe the various blocks in detail with the assumption that the same references will be used for identifying both the signal and the respective input or output line of each block.

In FIG. 4, the interface for connection with computer 15 is shown at 19.

Figure 5:
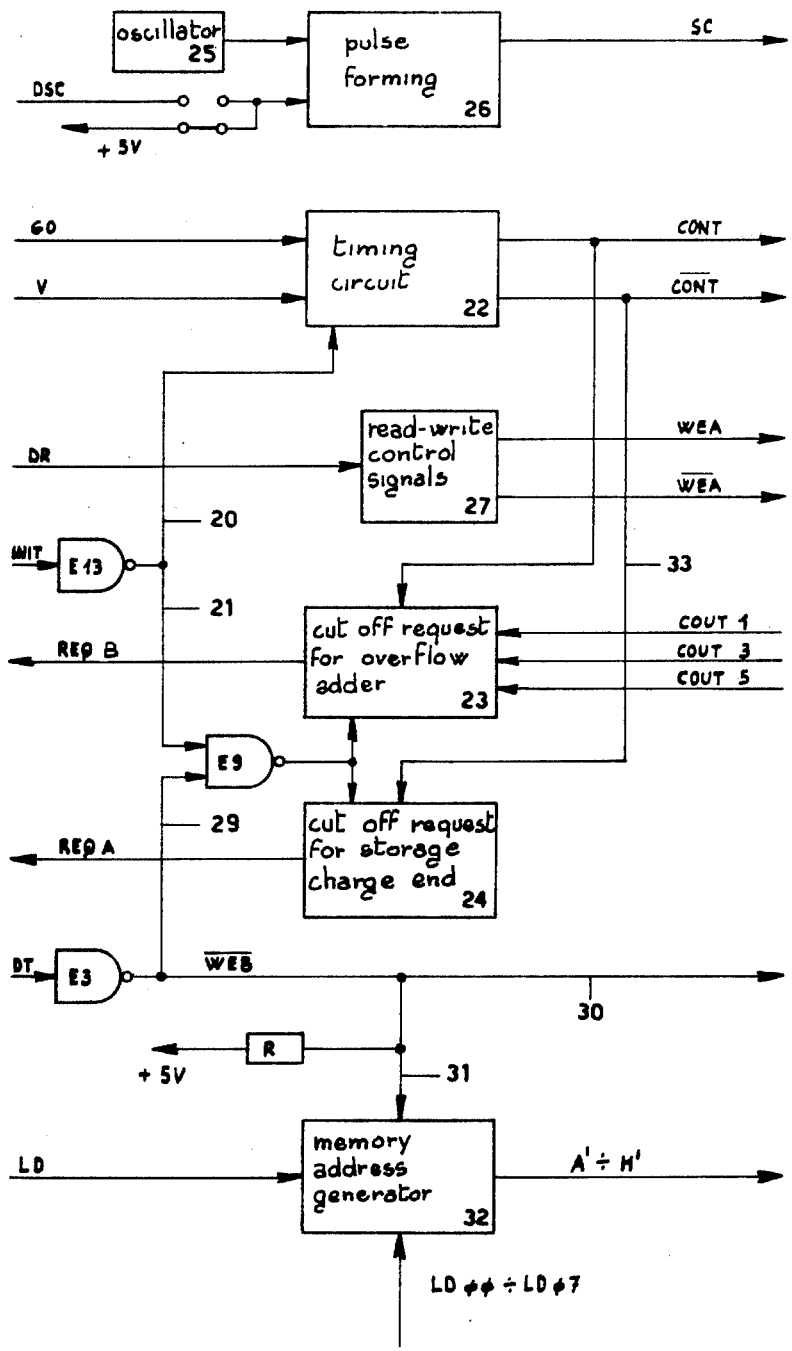
FIG. 5 is a detailed scheme showing the apparatus portion controlling the storing and accumulating blocks of FIG. 4.

Referring now to FIG. 4, it should be noted that as the operations begin, said computer 15 supplies through interface 19 a positive pulse-like signal, referred to as INIT, to control block 14; this signal serves for starting the operation of said block. Particularly, in block 14 said signal INIT is inverted by inverter E13 (FIG. 5); the output of which is branched into two connections 20 and 21, of which the former reaches a timing circuit 22, imparting thereto the initial output conditions CONT = 0L (signal CONT at logical level 0) and $\overline{CONT}$ = 1L (signal $\overline{CONT}$ at logical level 1). The second connection 21 reaches an input to gate E9, transmitting it to its output without any modification thereto since the other input to gate E9 is at a logical level 1 (1L), and then reaches block 23 or "cut off request for overflow adder", and respectively block 24 or "cut off request for storage charge end" of blocks 11, 12 and 13, starting the same so that zero logical level signals REQB = 0L and respectively REQA = 01 are supplied to interface 19 (FIGS. 4 and 5).

Then computer 15 supplies signal GO (FIGS. 4 and 5) to timing circuit 22, enabling the latter for operation; this signal GO comprises a transition between level 01 and level 1L.

At the first pulse V of vertical synchronism from block 4, following signal GO, the outputs CONT and $\overline{CONT}$ of said timing circuits 22 will switch, attaining the values 1L and 0L, respectively, CONT and $\overline{CONT}$ remain at this value until the second pulse V, at the arrival of which they return to the condition previously taken at starting (CONT = 0L; $\overline{CONT}$ = 1L). The $n$ subsequent V pulses, with $n$ preselectable by timing circuit 22, show no effect on outputs CONT and $\overline{CONT}$, while the incoming $n+1$ V signal restores CONT to condition 1L and $\overline{CONT}$ to 0L; thus, the above described cycle is repeated with a periodicity equal to $n+2$ V pulses to use a telecamera scanning every $n+2$ scannings.

Figure 6:
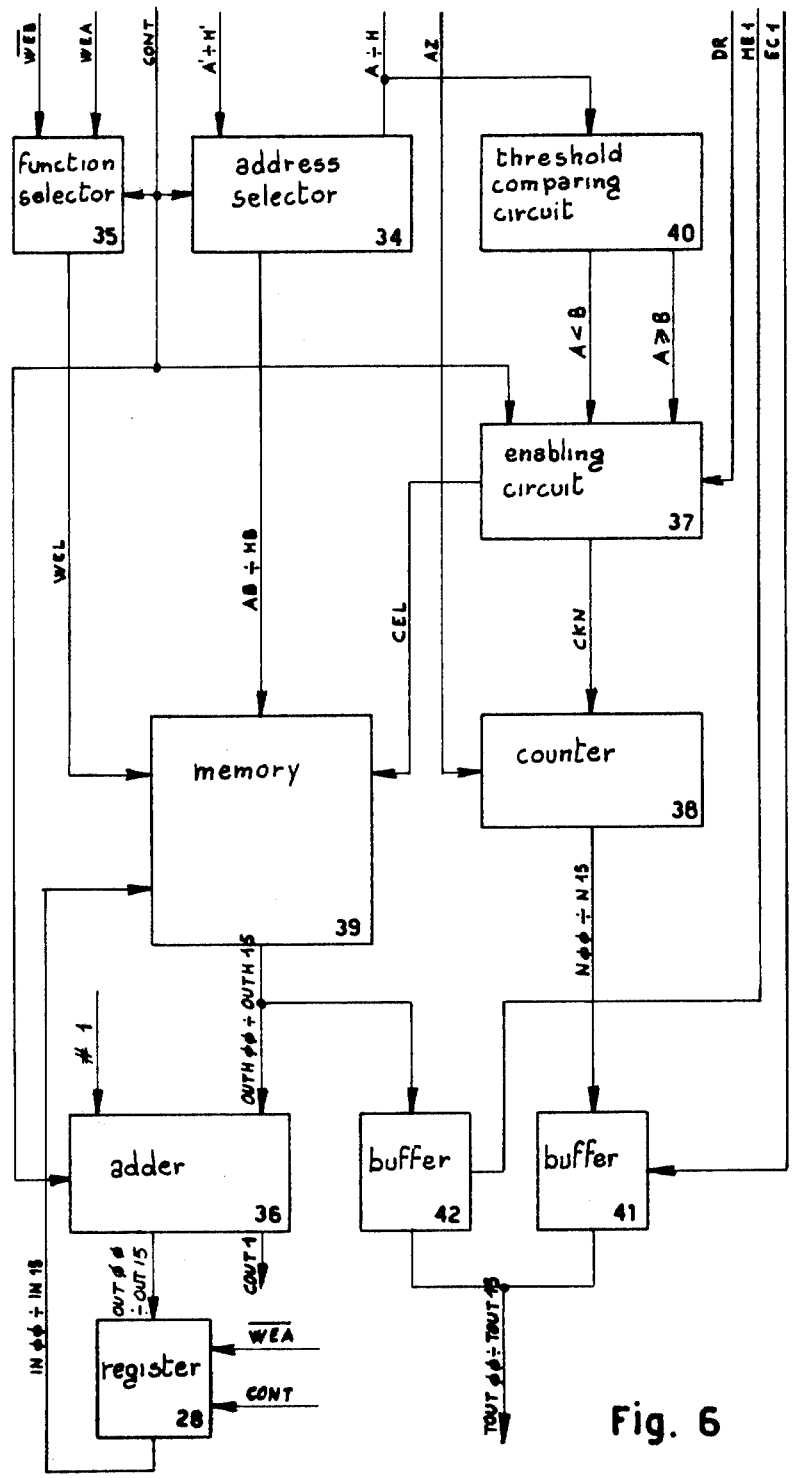
FIG. 6 is a detailed scheme of each of the storing and accumulating blocks of the luminance levels shown in FIG. 4.

This CONT signal is supplied to said three storing and accumulating blocks 11, 12 and 13, as shown in FIG. 4 or particularly in FIG. 6 of the accompanying drawings. When at a level 1L, this CONT signal enables the data acquisition step from converters 8, 9 and 10, respectively, and when at level 0L it enables the transmission to the computer for the three functions $g(li)$ relating to the single chromatic components, into which the image to be recognized has been decomposed, with the respective numbers $\overline{N}$ of dots used.

A quartz oscillator 25 (FIG. 5), such as a 4MHz oscillator, controls the frequency at which a pulse forming block 26 generates SC pulses for image sampling or discretioning.

Said SC pulses are simultaneously supplied to samplers 5, 6 and 7 of FIG. 1; from each of the samplers the sampled data are transmitted to the respective converter 8, 9 and 10 which upon conversion occurrence generates a DR pulse (data ready). As being simultaneous, any of these three pulses, for example pulse DR outgoing from converter 10 (FIG. 4), is used to control the "read-write" circuit comprising block 27 (FIG. 5), which is a monostable multivibrator dividing into two parts time Tc intervening between two DR pulses. During the first part, the output signal WEA from block 27 is at 1L level, and during the second part signal WEA is at level 0L. This signal WEA controls the function "read-write" of three storing and accumulating blocks 11, 12 and 13 causing, when its level is at 1L, a reading from the memory, and when at 0L a writing into the memory; while the complemented output $\overline{WEA}$ operates on the rising edge as a clock for registers 28, only one of which is shown in FIG. 6 hereinafter described.

Block 23 of "cut off request for overflow adder" is enabled to operation only during the period at which CONT signal is at level 1L, if during such a period any of the three input signals COUT 1, COUT 2 or COUT 3, respectively outgoing from blocks 11, 12 and 13 undergoes a transition from 1L to 0L. Then output signal REQ B passes to 1L, signalling computer 15 about an anomalous situation, outputs OUT00 + OUT15 from adder 36 (FIG. 6) higher than 16 bit; in this case, computer 15 supplies at its output 18 a non-recognition signal. REQ B remains at level 1L until computer has communicated the receipt of information by supply of signal DT.

DT is a positive pulse that after being completed by inverter E3 and indicated by $\overline{WEB}$ in FIG. 5, branches away on three connections: through the first connection 29 it reaches an input to gate E9 transmitting it as unaltered at its output (the other input to gate E9 being at level 1L) and therefrom to blocks "cut off request for overflow adder" 23 and "cut off request for memory charge end" 24, causing zeroing or reset of signal REQ B; the output of E3 then branches off in the successive connections 30, 31, of which connection 30 serves for simultaneous control of blocks 11, 12 and 13, while connection 31 serves for controlling a memory address generator 32.

Signal $\overline{WEB}$ on line 30 controls the function "read-write" of blocks 11, 12 and 13 during the period at which computer 15 is in data acquisition mode; when it is at level 0L, it will be writing, and when at level 1L it will be reading.

The transition 0L - 1L by signal $\overline{CONT}$ controls through connection 33 block 24 for "cut off request for memory charge end", so that the output REQ A of block 24 moves from 0L to 1L. This occurrence signals computer 15 the end of a data loading period from converters 8, 9 and 10 to storing and accumulating blocks 11, 12 and 13 for the duration of one scanning. The first pulse DT (transmitted data), subsequent to signal REQ A, resets said block 24 "cut off request for memory charge end" according to the above described modalities.

Memory address generator 32 is a counter operating as a programmable address generator, having loaded therein the starting address appearing on the eight input lines 'LD00÷LD07, by pulse LD; the starting address and pulse LD are supplied from computer 15.

The eight output addresses 'A' ÷ H" from block 32 are simultaneously supplied to blocks 11, 12 and 13 (FIG. 4) and the development thereof is controlled by signal $\overline{\text{WEB}}$ outputting from inverter E3 through the above mentioned connection 31.

Referring now to FIG. 6, we will hereinafter describe the operation of only one of said blocks 11, 12 and 13, for example block 11, since the operation thereof is identical and as to data acquisition step from the converter, it is concurrent.

Data acquisition from conversion block 8 is controlled by signal CONT at level 1l from control block 14. Thus, signal CONT presets the various blocks of the circuit of FIG. 6 for the following operation:
 (a) address selector 34: it transmits to its eight outputs designated at a whole at AB ÷ HB the signals A ÷ H from converter 8.
 (b) function selector 35: at its output WEL it transmits signal WEA from control block 14.
 (c) adder 36: it effects the sum of the signals present at the 16 inputs designated as a whole at OUTH00 ÷ +OUTH15 and the arithmetic number 1 present at input ≠ 1.
 (d) enabling circuit 37: it is enabled to operation by signal CONT.
 (e) register 28 is now enabled to operation by signal CONT, that is the conditions appearing at inputs OUT00 ÷ OUT15 will be transferred to outputs IN00 ÷ IN15 at each clock strike, rising edge of signal $\overline{\text{WEA}}$.

A signal AZ from computer 15 serves for resetting a counter 38 for $\overline{\text{N}}$ used of function $g(li)$.

At the arrival of signal DR from converter 8, the following events occur:
 (a) inputs A ÷ H of block 34 have already attained a stable condition;
 (b) signal WEA, and accordingly signal WEL, has moved to a ONE logical level (1L), imposing memory 39 the memory reading condition.

Inputs A ÷ H will both address in memory 39 the memory cell corresponding to the numerical value thereof, and to the threshold comparing circuit 40.

The latter performs the function of signalling the "gating circuit" 37 the condition A ÷ H higher than or equal to a lower threshold, and A ÷ H less than an upper threshold. Such thresholds serve to distinguish the image from the backing background colour which may be of a black colour (lower threshold) or white colour (upper threshold). Depending on which condition has been verified, the "gating circuit" 37 will enable or not memory 39 to operation when output CEL is at level 0L or respectively 1L.

If the memory is enabled to operation, then the contents "X" of the cell addressed by the number present on lines AB ÷ AH is present on output lines OUTH00 ÷ OUTH15 and is added in the adder along with number 1. Thus, on outputs OUT00 ÷ OUT15 the number "X + 1" will appear.

Now, the transition occurs of WEA from 1L to 0L and the resulting passage of $\overline{\text{WEA}}$ from 0L to 1L. This requires both the change of function for the memories (passing to the memory writing condition), and the storage of number "X + 1" by register 28 controlled from $\overline{\text{WEA}}$. Since the outputs IN00 ÷ IN15 of register 28 are connected with the corresponding inputs of memory 39, said number "X ÷ 1" will be written in the latter at the addressed cell.

Thus, at the end of a sampling period Tc, the contents of the memory cell addressed by the luminance numberized level A ÷ H will be incremented by one unit only if said luminance has met the conditions imposed by the thresholds of block 40. It will be readily understood that upon completion of scanning of image 3, in each of the memory cells that number is contained as corresponding to all the times the corresponding luminance level has been repeated. Substantially, the function $g(li)$ of occurrence frequency distribution for the luminance levels of FIG. 2 has been provided.

Number $\overline{\text{N}}$ corresponding to all of those dots the luminances of which have met the conditions imposed by the thresholds, has been counted by counter 38, which has received the control or drive pulses CKN from the "gating circuits" 37, whenever the memory has been enabled to operation. It should be noted that the number of cells in memory 39 shall be at least equal to the number of intervals in which the luminance level scale has been divided, for example 256 in the case of FIG. 2. A memory has also to be selected as capable of containing a high amount of dots for each luminance value, such as a 16 bit memory.

Figure 2:
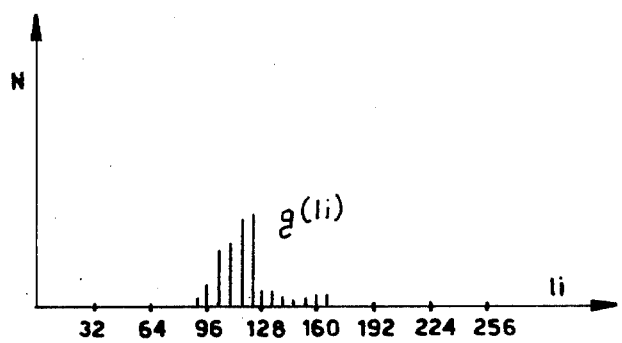
FIG. 2 is a diagram showing the distribution function of the luminance level frequencies for a chromatic component of the image to be recognized.

Loading of number $\overline{\text{N}}$ and function $g(li)$ of FIG. 2 in the computer memory is controlled by signal CONT (FIG. 6), which has moved to level 0L presetting the various circuit blocks for the following operation:
 (a) address selector 34: at its outputs AB ÷ HB this block transmits signals A' ÷ H' from control block 14;
 (b) function selector 35: at its output WEL it transmits the signal $\overline{\text{WEB}}$ from control block 14;
 (c) adder 36: it is blocked with outputs OUT00 ÷ OUT15 at 0L;
 (d) enabling circuit 37: it maintains output CEL always at 0L position to continuously enable memory 39; and
 (e) register 28 is reset, so that on output lines IN00 ÷ IN15 signals at logical zero level (0L) will be permanently present.

The procedure of data transfer to the computer memory occurs under the control of the latter that enables "Tristate Buffers" 41 and 42 of lines TOUT00 ÷ TOUT15 according to the following order: Tristate Buffer 41 revelant to number $\overline{\text{N}}$; Tristate Buffer 42 relelant to function $g(li)$ to FIG. 2. outputs TOUT00 ÷ TOUT15 of blocks 11, 12 and 13 are successively transferred to the computer.

Through signal ECL at level 0L, Tristate Buffer 41 relevant to number $\overline{\text{N}}$ is enabled to transfer the value of $\overline{\text{N}}$ on lines TOUT00 ÷ TOUT15 (and accordingly in the computer memory).

Then, signal ME1 at level 0L enables Tristate Buffer 42 to output the data present at the input and therefrom to computer 15.

At this stage, the cells of memory 39 are addressed by signals A' ÷ H' on lines AB ÷ HB, initially indicating the first cells "Ci" corresponding to the first luminance level above the threshold of function $g(li)$.

Therefore, the contents of this cell will be transferred to storage and, upon operation completion, signal $\overline{\text{WEB}}$ from inverter E3 (FIG. 5) will perform a dual function, of which the first is to cause memory 39 to read out the data present on the input lines (IN00 ÷ IN15), which is zero for the first cell, and the second is to advance or forward step the address generator (A' ÷ H') 32 of control block 14. As a result, the contents of cell "C$i$ + 1" will now appear on output TOUT00 ÷ TOUT15.

As in the former case, transfer to storage of this second data is followed by the supply of a signal $\overline{WEB}$ causing a zero to be written in cell "C$i$ + 1" and address generator 32 to be stepped by one unit.

Upon transfer completion, memory 39 that contained function $g(li)$ of luminance level frequency distribution will be reset and thus capable of restarting a new acquisition cycle. Now, the computer will provide for sequentially transferring the other data relevant to blocks 12 and 13 in accordance with the described process.

Now, all of the functions $g(li)$ relevant to all the chromatic components in which the image has been decomposed or resolved by telecamera 2 have been transferred to computer 15 and also the corresponding numbers $\overline{N}$ of dots used for each function will be present in said computer.

Thus, as duly programmed, computer 15 calculates the typical parameters for each of said functions $g(li)$, which parameters are the identifying elements of the image to be recognized.

By way of example, reference will be made to calculation of the typical parameters of FIG. 3, in which the diagram has been shown for the function $G(li)$ of the accumulated occurrence frequencies corresponding to the integration of a function $g(li)$.

In this case, the interval (FIG. 3) between zero and number $\overline{N}$ of used dots is divided into equal intervals, for example eight intervals. The typical parameters of function $g(li)$ which will be taken by calculating function $G(li)$ are the luminance levels S1, S2, S3, S4, S5, S6 and S7 corresponding to the values of number N1, N2, N3, N4, N5, N6 and N7 separating the calculated intervals.

In the particular case, these typical parameters are referred to as octiles.

In the following we will describe the operation of blocks 16 and 17, referring to a number of typical parameters calculated according to the example of FIG. 3, so that there will be seven parameters per chromatic component, plus only one number $\overline{N}$ of used dots for a preset chromatic component, that is a total of 22 parameters.

Hereinafter reference will be made to the block diagrams of FIGS. 7, 8 and 9.

Figure 7:
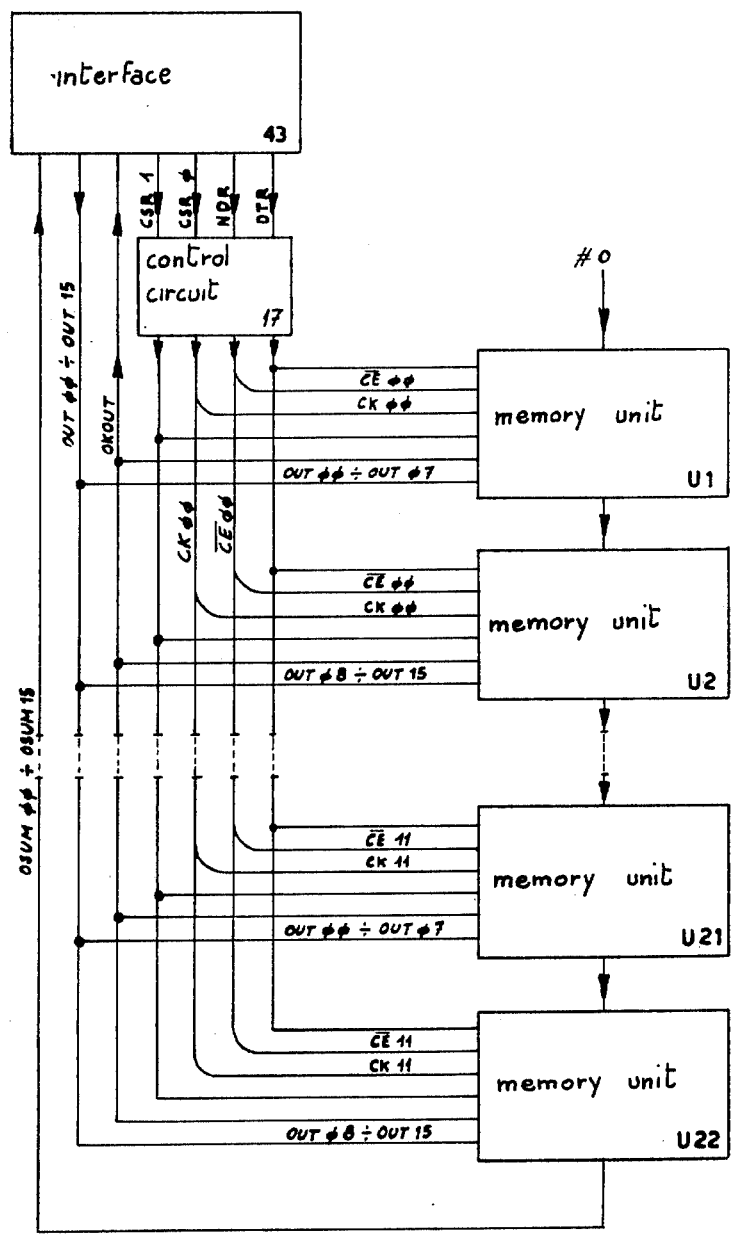
FIG. 7 is a view showing the connection diagram between the individual storing and comparing blocks of the various typical parameters, and the device selecting the results of the comparisons being effected and identifying the image to be recognized.
Figure 8:
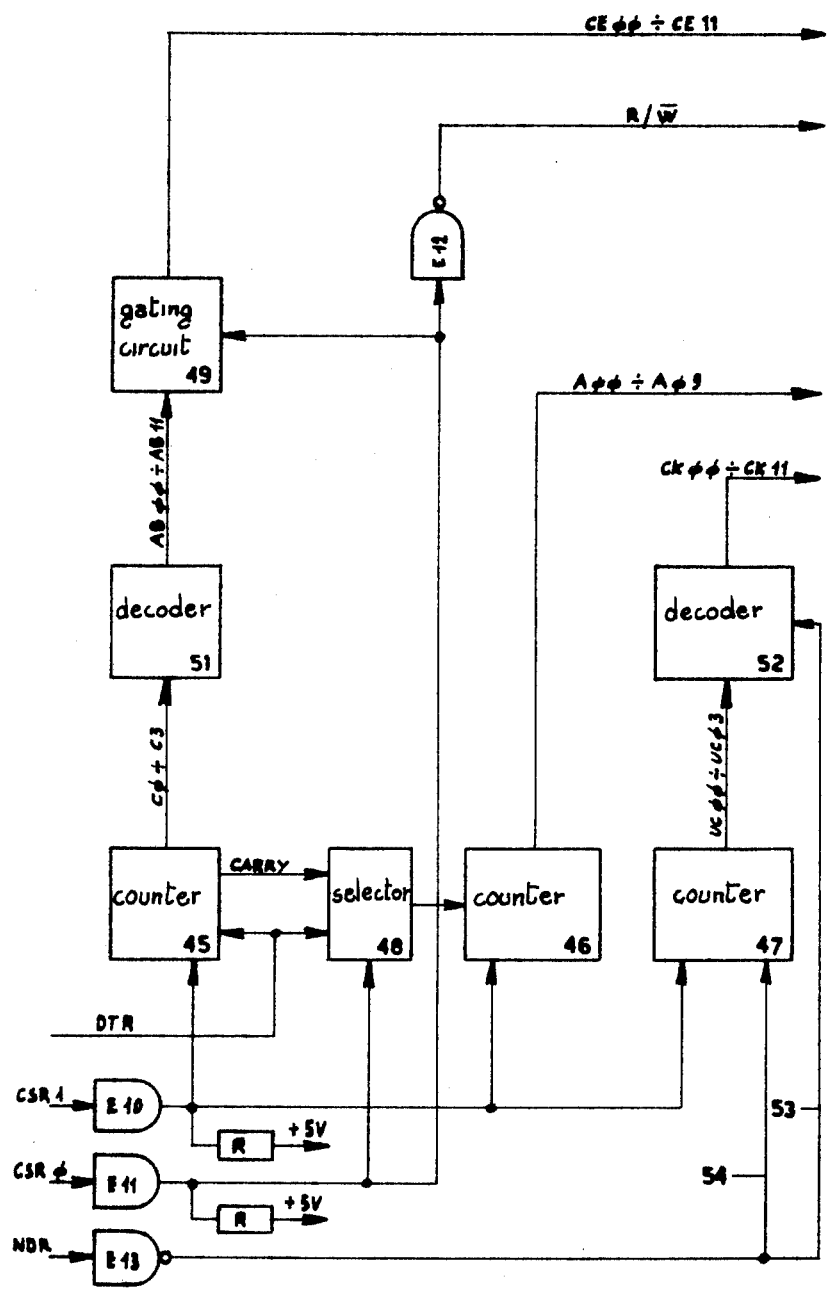
FIG. 8 is a detailed scheme showing the apparatus portion controlling the storing and comparing blocks shown in FIG. 7.

Computer 15 supplies through interface 43 to an input of control blocks 17 (FIG. 7), the scheme of which is shown in FIG. 8, first a pulse CSR1 which will reset counters 45, 46 and 47 (FIG. 8), after passing through the non-inverting pilot stage E10; counters 45 and 47 should have a fixed count capacity at least equal to the number of parameters or pairs of parameters in the example shown, and counter 46 should have a count capacity at least equal to the number of sample images by which the comparison is carried out. Then, computer 15 supplies levels 1L on line CSR0 which, after passing through the non-inverting pilot stage E11, branches to selector 48, gating circuit 49 and inverting pilot circuit E12, and imposes the following conditions:

selector 48 transmits at its output a "Carry" signal;
gating circuit 49 allows the transit for the signals supplied to its inputs AB00 ÷ AB11;
inverting pilot circuit E12 has a signal $R/\overline{W}$ at level 0L, imposing the function "read" to each memory 50 (FIG. 9) of the storing and comparing units U1 to U22 (FIG. 7). contained in storing and comparing block 16 of FIG. 1. One of the storing units is particularly shown in FIG. 9.

As a result of these initial conditions, binary-numerical decoder 51 will provide, since binary zero number is present at inputs C0 ÷ C3, an output of level 0L at only the signal AB00, and accordingly a signal CE00 appears at the output of gating circuit 49, thus enabling to operation the first two units of block 16, which are addressed to zero cell by the outputs A00 ÷ A09 of counter 46.

After these preliminary operations, there follows the loading step of parameters $p1 \div p22$ of the sample image. Such parameters correspond to octiles S1 ÷ S7 sequentially taken for the three chromatic components of the image, plus number $\overline{N}$. Since these parameters are coded at 8 bits and computer output register is at 16 bits, only one loading operation is used for storing the two parameters, the 8 bits of the former forming the low portion of the word and the 8 bits of the latter forming the top portion of said word.

Computer 15 simultaneously supplies parameters $p1$ and $p2$ of the first sample image to memory 50 (FIG. 9), respectively of the first and second memory units U1, U2.

Signal DTR supplied from the computer to signal operation execution increments counter 45 by one step, whereby decoder 51 will provide a signal at level 0L on the only output AB01 which will be accordingly transmitted on output CE01 of circuit 49. This means that, remaining the addressed cell at a stationary state, since address A00 ÷ A09 are unaltered, the memory units involved are now the third and fourth units U3 and U4, respectively, to which the computer will supply parameters $p3$ and $p4$ with a similar process to that above described. Upon operation completion, the computer supplies pulse DTR incrementing counter 45 and bringing it to value 2. Accordingly, output AB02 will now be at level 0L and as a result also signal CE02, and so on for the other parameters. Loading operations for the sample image data follow one another with the above describe modalities to the eleventh signal DTR; signalling that parameter $p22$ (corresponding to $\overline{N}$) has been loaded in memory 50 of the twenty second memory unit U22. Thus, the first memory cell of the 22 units U1 ÷ U22 has been completed.

In order to load the parameters for a second sample image, counter 45 should now be reset and cell addresses be incremented by one unit. This is provided by supplying further five pulses DTR by the computer, these pulses having the purpose of causing 16 bit counter 45 to reach count end, thus obtaining both resetting of its outputs and supply through selector 48 of "Carry" pulses to counter 46, which will be incremented by one unit.

Now, we are again at the above described starting conditions, with the only variant that now the cell being addressed from A00 ÷ A09 is the second cell for all the units U1 ÷ U22 and accordingly the operations are identically repeated as before.

Thus, all the parameters of all the sample images con be loaded in the memory units U1 ÷ U22 of storing and comparing block 16 (FIG. 1). This loading operation for the parameters of the sample images is carried out only once at the beginning of the operations.

Now, the comparing step can be started between the parameters of image 3 to be recognized with the parameters of the sample images. The comparison is carried out in two steps, that is loading of parameters for the image to be recognized on memory units U1 ÷ U22 and comparison operation with the corresponding parameters of the sample images.

As to the first step, computer 15 imposes with signal CSR0 at level 0L the following conditions to the apparatus:

(a) selector 48 receives signal DRT and at the output carries it to counter 46;

(b) gating circuit 49 sets all of its outputs at a level 0L, receiving the signal CSR0 from the computer, which means that the first cell of all the memory units U1 ÷ U22 is simultaneously enabled.

Then, computer 15 supplies parameters $p1 \div p22$ of the image to be recognized, two by two as in the former case, but following by pulse NDR (FIG. 8) which through inverting circuit E13 branches on connection 53 to decoder 52 and on connection 54 to counter 47. Output UC00 ÷ UC03 of counter 47 will be incremented by one and supplied to decoder 52 which, as enabled by signal $\overline{NDR}$, decodes it, generating on one of its outputs CK00 ÷ CK11 a pulse CK$i$ (with $i$ varying from 00 to 11), serving as loading control of register 56 (FIG. 9) for the corresponding pair of memory uits U1 ÷ U22.

Upon loading completion, the computer supplies again pulse CSR1 which through E10 resets all the counters 45, 46 and 47. Thus, all the parameters of the image to be recognized are simultaneously compared with all the parameters of the first sample image.

The comparison is hereinafter explained with reference to FIG. 9 showing the block diagram of only one memory unit, for example U1, the other units being quite identical, with the only difference that for the first unit of each pair of adjoining units contact 54 is closed and contact 55 is open, whereas for the second unit the opposite condition occurs, since lines IN00 ÷ IN07 go to units of odd index and lines IN08 ÷ IN15 go to units of even index.

The detailed block diagram of the connections between memory units U1 ÷ U22, control block 17 and computer 15 is shown in FIG. 7.

We have already discussed the operation of storing the parameters of the sample images and image to be recognized. Now we will describe only the part relating to the comparison that, in the particular case, is carried out by calculating the square of the difference between corresponding parameters and the sum of all the calculated squares.

For the comparison, outputs M00 ÷ M0 7 of memory 50 containing a parameter of the sample images and inverted outputs Q00 ÷ Q07 of register 56 containing the corresponding parameter of the image to be recognized are subtracted in complement to two in adder 57. Should the result be negative, adder 57 supplies at level 0L the signal COUTP which through inverting pilot circuit E14 causes both inverter 58 to transmit at its outputs U00 ÷ U07 the signals present at its inputs S00 ÷ S07 as inverted, and adder 59 to sum the unit to the number U00 ÷ U07 present at its inputs. On the other hand, should the difference be positive, signal COUTP moves to level 1L and accordingly outputs S00 ÷ S07 of block 57 pass through block 58 and block 59 without any inversion and without being added to the unit. Thus, at the output from block 59 the difference module on outputs MOD00 ÷ MOD07 is provided.

Module MOD00 ÷ MOD07 is supplied for comparison with a predetermined threshold in threshold comparator 60. The output OUTA of the latter controls an inverting open-collector pilot circuit E15, the output OKOUT of which is connected both with all of the other similar outputs on the other storing units U2 ÷ U22, and computer 15.

Thus, if all the comparators 60 of units U1 ÷ U22 have provided an output signal at level 0L, meaning that the modules MOD00 ÷ MOD07 of all the units are lower than the respective thresholds, then signal OKOUT remains at level 1L after inverter E15, signalling computer 15 that the whole operation is normal and the comparison operation can be proceeded to. On the other hand, if one or more of these comparators has provided an output signal at level 1L, that is module MOD00 ÷ MOD07 exceeds the threshold, then signal OKOUT moves the level 0L, signalling computer 15 that the result is unacceptable.

Concurrently with the aforesaid comparison operation, the only outputs MOD00 ÷ MOD03 are supplied to a circuit 61 providing for square operation thereof: QUAD00 ÷ QUAD07 = = (MOD$\phi\phi$ ÷ MOD$\phi$3)$^2$.

It should be noted that in this particular case only outputs MOD00 ÷ MOD03 have been taken from adder 59, such outputs corresponding to a maximum decimal number 16 for calculating the square thereof, it being selected that differences for parameters of a higher value than 16 should indeed be considered as generated by parameters not pertaining to the same aggregate of images. In said threshold comparator 60 the thresholds may vary from a minimum decimal value 1 to a maximum decimal value 16. Of course, the various threshold values may be differently selected depending on the type of parameters and comparison modalities.

It should be noted that instead of calculating the difference square, a weighting could be carried out by multiplying the differences between corresponding parameters by a constant.

Outputs QUAD00 ÷ QUAD07 are then supplied to adder 62. Adders 62 for the various memory units U1 ÷ U22 are connected as follows: adder pertaining to the first unit U1 relating to the first parameter $p1$ has, in addition to the above mentioned quadratic spread, number zero as second input (ISUM00 ÷ ISUM15), while its outputs of O SUM00 ÷ OSUM15 are connected to inputs ISUM00 ÷ ISUM15 of adder 62 of the next memory unit U2; outputs OSUM00 ÷ OSUM15 of this second unit U2 are connected to inputs ISUM00 ÷ ISUM15 of adder 62 of the third unit U3, and so on in succession to the twenty-second unit, the adder 62 of which will have its outputs connected to computer 15.

This type of connection provides that at output OSUM00 ÷ OSUM15 of the twenty-second unit U22, the sum appears of the squares of differences between the parameters of the image to be recognized and the corresponding parameters of the first sample image, that is the sum of the weighted differences, where a weighting of the differences is carried out. Should, as previously mentioned, signal OKOUT supplied to computer 15 be at level 1L, then said computer 15 acquires this data, otherwise lost, proceeding to the comparison of the parameters of the image to be recognized with the corresponding parameters of the next sample image. In other terms, the computer supplies a pulse DTR causing address counter 46 to forward step by one unit, presenting to comparison the parameters of the next sample image contained in the next cell of each unit U1 ÷ U22. Therefore, the above described calculation is repeated, with the relative acquisition of the result by the computer and supply of a signal DRT, and so on until the comparison is carried out with the parameters of all the sample images, contained in the memories 50 of the various storing units U1 ÷ U22.

It was mentioned that, whenever a comparison is carried out between the parameters of the image to be recognized and those of a sample image, computer 15 receives in its storing register the sum of the squares of differences between parameters corresponding to the image to be recognized and a sample image.

Whenever a sum of squares reaches the computer, the comparison is carried out with the previously stored sum of squares, rejecting the higher value and retaining the lower one. At the end of the comparison of the image to be recognized with all the sample images, there will remain in the computer the minimal square sum which, in turn, will be compared in the computer itself with a predetermined threshold value. Should the minimal square sum be lower than this threshold value, computer 15 will provide at its output 18 a signal of occurred recognition, along with the cell address of all memories 50 corresponding to the sample image, to which the now recognized real image corresponds.

Otherwise, should this value be above the threshold establisched in the computer, the latter will provide a non-recognition signal at its output 18. Upon recognition completions, the computer will provide a signal CSR1 (FIGS. 7 and 8) resetting counters 45, 46 and 47 of control block 17, so that the apparatus is now preset for carrying out the recognition of a new image according to the above described modalities.

What is claimed is:

1. A method for real time recognition of a test image supported on a background by comparison with known sample images, and selection of the sample image showing the least difference, comprising the steps of:
  (a) preparing and storing for reference a plurality of sets of sample typical parameters, each set of typical parameters derived from the luminance of an individual known sample image;
  (b) reading said test image on said background with a scanning device to produce a plurality of test signals proportional to the levels of luminance of said test image and said background;
  (c) separating said test signals into discrete accumulations of signals having the same luminance level;
  (d) eliminating from said plurality of test signals those signals produced from reading of said background;
  (e) preparing from said separated test image signals a distribution function having luminance levels for one axis and frequency of occurrence of test image signals for the other axis, background signals being absent from said distribution function;
  (f) operating on said distribution function of said test image signals to determine a set of test image typical parameters from said distribution function;
  (g) comparing said test image typical parameters with said plurality of sets of sample image typical parameters, each set being compared in sequence, said sets of sample image typical parameters having been prepared in the manner of steps (b) to (f);
  (h) selecting the one set of sample image typical parameters which in said comparison indicates the least difference with said set of test image typical parameters;
  (i) comparing said least difference with a threshold value of difference; and
  (j) generating a signal indicating the sample image providing said least difference when said least difference is less than said threshold value of difference.

2. The method of claim 1 wherein said test signals are produced in analog format, and further comprising the additional step to follow step (b) of:
  converting individually said plurality of analog test signals to corresponding digital signals.

3. The method of claim 1 wherein in step (e), there is prepared a distribution function, said prepared function being a distribution histogram.

4. The method of claim 1 wherein said operation (f) on said distribution function includes the further steps of:
  (1) integrating said luminance level occurrence frequencies of said distribution function with respect to said luminance levels to produce a summation function of signal occurrence versus said luminance levels,
    the highest value of summed signal occurrences equalling the total, $\overline{N}$, of said image test signals absent all background test signals;
  (2) selecting a set of individual luminance values corresponding to each of a plurality of individual values of summed signal occurrences, said individual values of summed signal occurrences being selected at intervals in a structured format and including the value $\overline{N}$, said selected set of luminance values being said set of test image typical parameters.

5. The method of claim 1, wherein the comparison in sequence of said test image typical parameters with said sets of typical parameters of said sample images includes calculating the difference between corresponding parameters of said test image and each sample image, and calculating the individual sum of the obtained differences for each of said sets of sample image typical parameters.

6. The method of claim 5, wherein said differences are weighted by multiplying said differences between corresponding parameters by a constant.

7. The method of claim 5, wherein said differences between parameters are mathematically raised to a power.

8. The method of claim 1 wherein said test images, when read as test signals, are decomposed into basic chromatic components, and said sets of sample typical parameters are prepared and stored in corresponding chromatic components from known sample images, and said steps (c), (d), (e), (f), (g), (h), (i), and (j) are implemented on the test signals of each chromatic component, and said sample typical parameters of the same chromatic component are used in said comparison.

9. An apparatus for real time recognition of a test image supported on a background by comparison with known sample images, and selection of the sample image showing the least difference, comprising:
  (a) means for preparing and storing for reference a plurality of sets of sample typical parameters, each set of typical parameters derived from the luminance of an individual known sample image;
  (b) scanning means for reading the said test image on said background to produce a plurality of test signals proportional to the levels of luminance of said test image and said background;

(c) means for separating said test signals into discrete accumulations of signals having the same luminance level;
(d) means for eliminating from said plurality of test signals those signals produced from reading of said background;
(e) means for preparing from said separated test image signals a distribution function having luminance levels for one axis and frequency of occurrence of test image signals for the other axis; background signals being absent from said distribution function;
(f) means for operating on said distribution function of said test image signals to determine a set of test image typical parameters from said distribution function;
(g) means for comparing said test image typical parameters with said plurality of sets of sample image typical parameters, each set being compared in sequence;
(h) means for selecting the one set of sample image typical parameters which in said comparison indicates the least difference with said set of test image typical parameters;
(i) means for comparing said least difference with a threshold value of difference; and
(j) signal generating means for indicating the sample image providing said least difference when said least difference is less than said threshold value of difference.

10. The apparatus of claim 9, wherein said means for separating said test signals into discrete accumulations comprises an address selector circuit for a memory having a capacity equal to a number of preselected luminance levels, each luminance level signal arriving at said address selector driving a corresponding memory cell to transmit its content to an adder where said content is incremented by one unit, said incremented content being then returned through a register to said memory cell.

11. The apparatus of claim 9, further comprising a counter of the total number of luminance level test signals within two preset end threshold levels of luminance, whereby test signals representative of said background are eliminated from said total number.

12. The apparatus of claim 9, wherein said means for storing and said means for comparing said sample typical parameters comprise a memory for the typical parameters of sample images, a register for storing the corresponding said typical parameters of the test image to be recognized, said memory and said register being connected to circuit means for providing the differences between said sample and said test parameters and summing the absolute values of said differences thus obtained.

13. The apparatus of claim 12, further comprising circuit means for weighting the absolute values of said parameter differences.

14. The apparatus of claim 13, wherein said means for weighting the absolute values of said differences between said parameters includes means to raise said absolute values to a power.

15. The apparatus of claim 12 wherein said means for comparing said least difference operates on said summed absolute values of said parameter differences.

16. The apparatus of claim 9, wherein said test image is decomposed by said scanning means into basic chromatic components, said means for separating and accumulating comprising independent storing and accumulating means for each chromatic component of said test image, and said means for separating and accumulating simultaneously operating.

17. The apparatus, of claim 16 wherein said storing means and said comparing means include a storing and comparing unit for each typical parameter of each basic chromatic component of said test image, and said circuit means for summing said absolute values of said differences are series interconnected, whereby each of said summing circuit means adds to its content the content of the preceding adders.

* * * * *